US007298614B2

(12) United States Patent
Halliday et al.

(10) Patent No.: US 7,298,614 B2
(45) Date of Patent: Nov. 20, 2007

(54) TELCO HUB AND METHOD

(75) Inventors: David J. Halliday, West Leake (GB); Brian A. Carr, Loughborough (GB); Paul A. Moakes, Derby (GB)

(73) Assignee: Motorola, Inc., Schaumburg, IL (US)

( * ) Notice: Subject to any disclaimer, the term of this patent is extended or adjusted under 35 U.S.C. 154(b) by 248 days.

(21) Appl. No.: 11/287,766

(22) Filed: Nov. 28, 2005

(65) Prior Publication Data

US 2007/0159788 A1 Jul. 12, 2007

(51) Int. Cl.
*G06F 1/16* (2006.01)
(52) U.S. Cl. ............... 361/686; 439/76.1; 709/233
(58) Field of Classification Search ............. 370/216, 370/227, 442; 709/203, 230, 233; 710/300, 710/301; 439/76.1, 65; 454/184; 361/730, 361/724–727, 679–687
See application file for complete search history.

(56) References Cited

U.S. PATENT DOCUMENTS

| | | | |
|---|---|---|---|
| 6,932,617 B2 * | 8/2005 | Debord et al. | 439/65 |
| 2004/0209493 A1 * | 10/2004 | Garnett et al. | 439/76.1 |
| 2005/0251607 A1 * | 11/2005 | Harris et al. | 710/301 |
| 2006/0256534 A1 * | 11/2006 | Garnett et al. | 361/730 |
| 2007/0207720 A1 * | 9/2007 | Henry et al. | 454/184 |

OTHER PUBLICATIONS

RTC Update Newsletter, Jun. 2005, p. 3, Para. 2: retrieved from the internet (retrieved on Apr. 29, 2007) URL: http://www.rtcmagazine.com/home/news_0506.php(1 of 6).

Moving to IP-based Telco Applications, by Intel, dated Oct. 2001, Abstract p. 4, col. 1, Para. 2, p. 10, col. 2, Para 2: retrieved from the internet (retrieved on Apr. 29, 2007) URL: http://www.intel.com/network/csp/pdf/telco_applications_whitepaper.pdf.

BladelLetter, date Q1 2004, p. 9, Para. 4: retrieved from the internet (retrieved on Apr. 29, 2007) URL: http://www.bladeletter.com/English/Newsletters?2004/BladeLetter_1Q2004.pdf.

"Advanced MC™ Advanced Mezzanine Card Base Specification", PICMG® AMC.0 RC1.1, PCI Industrial Computers PICMG®, Dec. 3, 2004, pp. iii thru C6.

BladeCenter. [Online] Available http://www-03.ibm.com/servers/eserver/bladecenter/, Nov. 16, 2005.

* cited by examiner

*Primary Examiner*—Hung Van Duong

(57) ABSTRACT

A telco hub in a chassis having a front side and a rear side, where the chassis includes a midplane having a first side and a second side, the telco hub includes an interposer module coupled to slidably insert into a switch slot on the rear side and connect to the second side of the midplane, a mezzanine module coupled to the interposer module, where the mezzanine module includes a telco I/O interface, where the mezzanine module is coupled to receive non-packetized telephony data. The telco hub is coupled to convert the non-packetized telephony data to packetized data, and communicate the packetized data to one or more of a plurality of payload modules over a switched fabric on the midplane, where each of the one or more payload modules is coupled to the first side of the midplane via a payload slot on the front side of the chassis.

23 Claims, 3 Drawing Sheets

TELCO HUB AND METHOD

BACKGROUND OF INVENTION

Several chassis-based, modular computer systems target server-based applications, such as the IBM BladeCenter™ computer systems. Currently, such server-based computer systems limit support for telephone company (telco) style interfaces, thereby limiting the integration of server-based platforms with the processing of telephony data. Currently, these same server-based computer systems limit support for front panel input/output (I/O) due to air filter placement and lack of defined cut-outs in a standards-based way to support front panel I/O. In addition, there is a need, not found in the prior art, to support redundancy and switching of telco traffic within server-based chassis.

There is a need, not met in the prior art, to allow server-based computer systems to receive and process telephony data through telco I/O interfaces in the rear side of the chassis. Accordingly, there is a significant need for an apparatus that overcomes the deficiencies of the prior art outlined above.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", and the like in the Description and/or in the Claims, if any, are generally employed for descriptive purposes and not necessarily for comprehensively describing exclusive relative position. Any of the preceding terms so used may be interchanged under appropriate circumstances such that various embodiments of the invention described herein may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

Software blocks that perform embodiments of the present invention can be part of computer program modules comprising computer instructions, such control algorithms that are stored in a computer-readable medium such as memory. Computer instructions can instruct processors to perform any methods described below. In other embodiments, additional modules could be provided as needed.

A detailed description of an exemplary application is provided as a specific enabling disclosure that may be generalized to any application of the disclosed system, device and method for an interposer module in accordance with various embodiments of the present invention.

Figure 1:
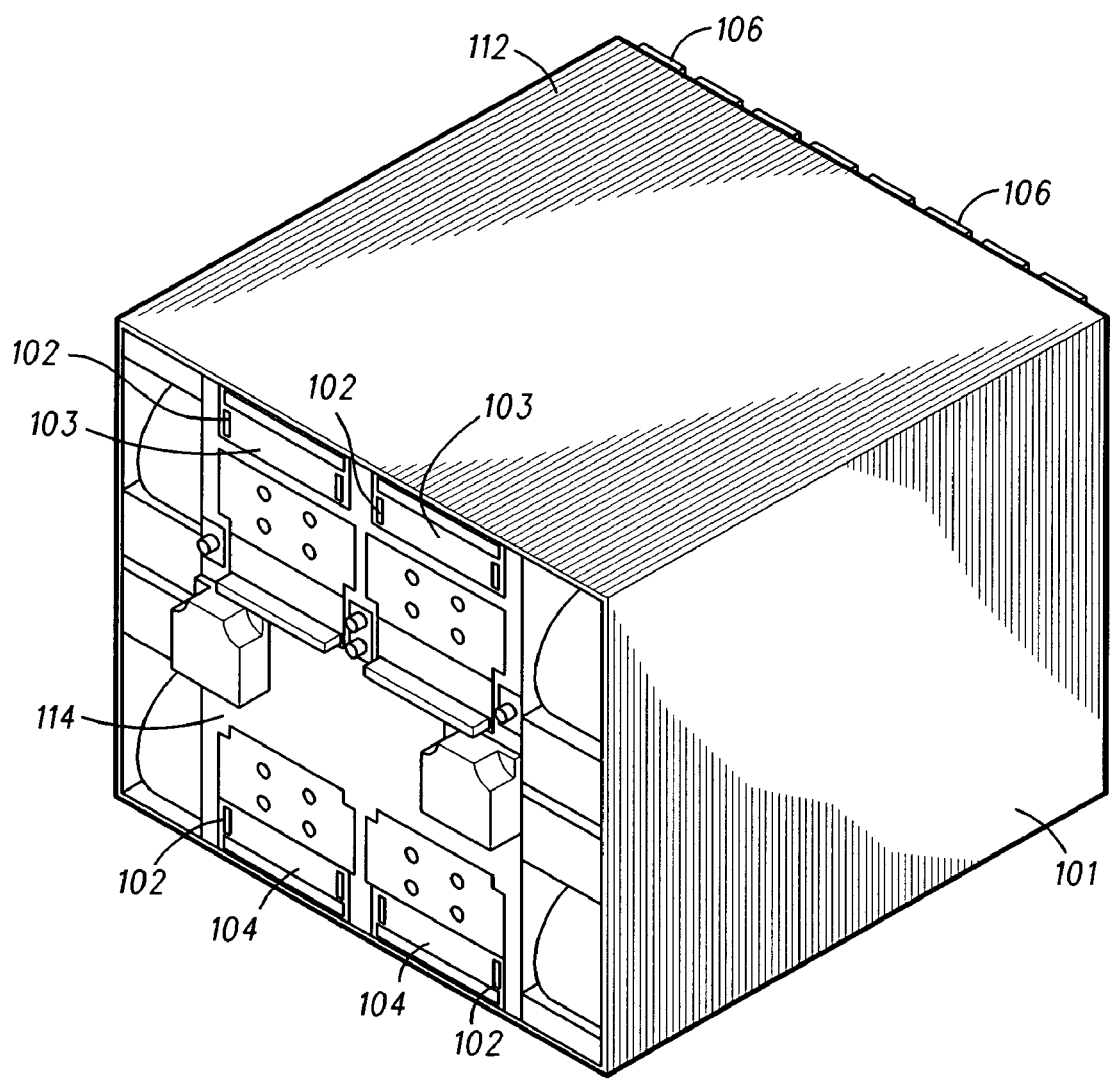
FIG. 1 representatively illustrates a computer system in accordance with an exemplary embodiment of the present invention.

FIG. 1 representatively illustrates a computer system 100 in accordance with an exemplary embodiment of the present invention. Conventional subrack-based, modular computer systems 100 have slots for the insertion of payload modules 106 that add functionality to the computer system 100. Payload modules 106 are designed to plug directly into the backplane of a chassis 101. These payload modules 106 may include processors, memory, storage devices, wireless communication modules, and the like. Carrier modules are payload modules that are designed to have one or more mezzanine modules plugged into them to add even more modular functionality to the computer system 100. Mezzanine modules differ from payload modules in that mezzanine modules are not coupled to physically connect directly with the backplane, whereas payload modules function to physically directly connect with the backplane.

The computer chassis 101 illustrated in FIG. 1 includes a front side 112 and a rear side 114 opposite each other. The front side 112 is disposed to accept a plurality of payload modules 106, while the rear side 114 includes a plurality of switch slots 102, each disposed to accept a switch module 103. In an embodiment, switch module 103 may act as a central switching hub with any number of payload modules 106 coupled to switch module 103 to form star, dual-star or mesh network. For example, a switch module 103 may be a central switching hub in a switched fabric.

The computer chassis shown in FIG. 1 may be an IBM BladeCenter™ chassis, which may accommodate up to fourteen payload modules via the front side 112 and include four switch slots 102 on the rear side 114. The IBM BladeCenter™ chassis is primarily a server-based blade chassis, where each payload module 106 may include multiple two-way servers for use in an Enterprise environment. In the prior art, the IBM BladeCenter™ chassis does not include adequate support for I/O in the front side 112 because of the position of the blowers (for cooling) and the lack of defined, standards-based cut-outs for I/O interfaces in and around the air filter. Also in the prior art, the IBM BladeCenter™ chassis does not include telephone company (telco) I/O on the rear 114 of the computer chassis.

In an embodiment, any of plurality of switch slots 102 is disposed to accept interposer module 104 in place of a switch module, where the interposer module 104 functions as a carrier card and allows the coupling of a mezzanine module (not shown for clarity) to the backplane of the chassis. In an embodiment, the mezzanine module may have an I/O interface to allow telephony data to be received by chassis and be processed within the chassis by one or more payload modules 106. In an embodiment, two of the switch slots 102 may have switch modules 103 in place, while another two switch slots 102 each have an interposer module 104 in place as shown.

Figure 2:
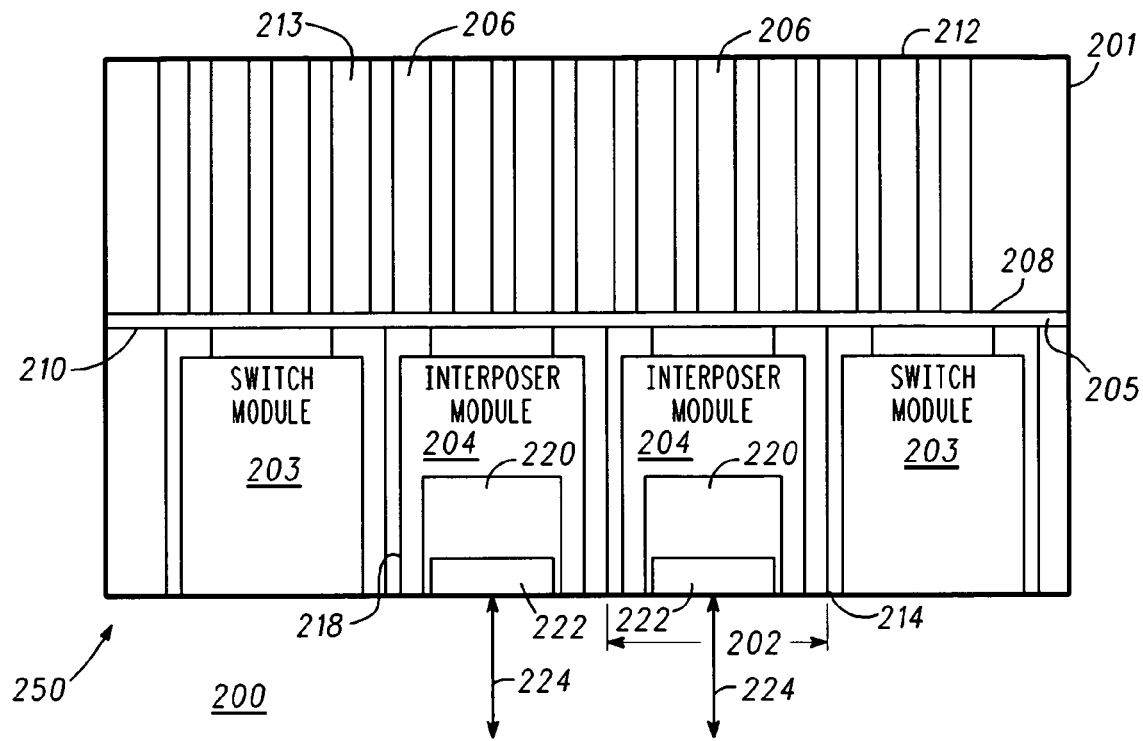
FIG. 2 representatively illustrates a computer system in accordance with another exemplary embodiment of the present invention.

FIG. 2 representatively illustrates a computer system 200 in accordance with another exemplary embodiment of the present invention. In the embodiment shown, computer system 200 includes a chassis 201 having a midplane 205 type backplane, where the midplane 205 includes a first side 208 and a second side 210 opposite to each other.

For example, chassis 201 may have a front side 212 with one or more payload slots 213, each coupled to receive a payload module 206 inserted via the front side 212, where the payload module 206 connects directly to the first side 208 of the midplane 205. In an embodiment, the form factor of payload modules 206 are 7U, where as known in the art, "U" and multiples of "U" can refer to the length or depth of a payload module 206. In an embodiment, "U" can measure approximately 1.75 inches. This is not limiting of the invention as payload modules 206 may have any form factor and be within the scope of the invention. Chassis 201 may also have a rear side 214 with one or more switch slots 202, each designed to receive a switch module 203 inserted via the rear side 214, where switch module 203 connects directly to the second side 210 of the midplane 205.

Chassis 201 is illustrated in plan view with payload modules 206 mounted vertically, while switch modules 203 and interposer modules 204 are mounted horizontally. This is not limiting of the invention as the payload modules 206, switch modules 203 and interposer modules 204 may be mounted in any horizontal or vertical combination and be within the scope of the invention.

In an embodiment, chassis 201 may be an IBM BladeCenter™ chassis as is known in the art. Switch modules 203 may be the hub, and payload modules 206 the blades, of a switch fabric 250 operating on midplane 205. In an embodiment, switch fabric 250 may be implemented by using one or more of a plurality of switch fabric network standards, for example and without limitation, InfiniBand™, Advanced Switching, Serial RapidIO™, FibreChannel™, Ethernet™, Gigabit Ethernet, PCI Express™, Hypertransport™, and the like. Switch fabric 250 is not limited to the use of these switch fabric network standards and the use of any switched fabric network standard is within the scope of the invention.

In an embodiment, midplane 205 comprises plurality of packet-based links capable of transmitting packet-based signals from/to payload modules 206, switch modules 203 and interposer modules 204. As an example of an embodiment, each of plurality of packet-based links can comprise two 100-ohm differential signaling pairs per channel. Each channel can use high-speed serialization/deserialization (SERDES) and 8$b$/10$b$ encoding at speeds up to 3.125 Gigabits per second (Gb/s). This is not limiting of the invention, as each channel may use encoding speeds in excess of 3.125 Gb/s.

The chassis 201 depicted in FIG. 2, particularly a BladeCenter™ chassis, has switch slots 202 that will each accommodate a mezzanine module 220. In an embodiment, mezzanine module 220 may be a Common Mezzanine Card (CMC) having a CMC form factor. CMC form factor, including mechanical dimensions, electrical specifications, and the like, are known in the art and set forth in the Institute of Electrical and Electronics Engineers (IEEE) standard P1386. A particular example of an embodiment of mezzanine module 220 is a PCI mezzanine card (PMC) as is known in the art.

In another embodiment, mezzanine module 220 may be an Advanced Mezzanine Card (AMC) module. The Advanced Mezzanine Card Base Specification (PICMG® AMC.0 RC1.0 and subsequent versions) defines the AMC module including electrical specifications and form factors. AMC modules can be single-width, double-width, full-height, half-height modules or any combination thereof as defined by the AMC specification.

Since there are subtle differences between chassis 201 and switch slot 202 designed to accept a switch module 203, particularly a BladeCenter chassis, an interposer module 204 is coupled to bridge the differences and act as an adapter and map the mezzanine module 220 to the switch slot 202. The differences may include connector style, power supply and Intelligent Platform Management Interface (IPMI) events (such as power up/down, hotswap, and the like).

Interposer module 204 may have form factor such that it slidably inserts into switch slot 202 and interfaces directly with second side 210 of midplane 205. Interposer module 204 may have a midplane connector such that it connects directly with midplane 205 and adapts power and data signals to mezzanine module 220.

In an embodiment, mezzanine module 220 may include telephone company (telco) I/O interface 222, which is a physical and logical connection for one or more telephone company links (i.e. telco links 224). In an embodiment, telco I/O interface 222 may be a publicly switched telephone network (PSTN) interface coupled to interface with telco links 224, for example and without limitation, telco trunk lines. In an embodiment, telco I/O interface 222 may include one or more of T1/E1/J1 interface, T2/J2 interface, T3/E3/J3 interface, OC-n DS3 interface, optical ATM interface, channelized STM-n interface, channelized STM-nc interface, and the like.

ATM is short for Asynchronous Transfer Mode, a network technology based on transferring data in cells of a fixed size. The small, constant cell size allows ATM equipment to transmit video, audio, and computer data over the same network, and assure that no single type of data hogs the line. ATM creates a fixed channel, or route, between two points whenever data transfer begins. This differs from TCP/IP, in which messages are divided into packets and each packet can take a different route from source to destination.

In an embodiment, telco I/O interface may include BNC or TNC type connectors. BNC is short for Bayonet Neill Concelman connector that is a type of connector used with coaxial cables such as the RG-58 A/U cable. The basic BNC connector is a male type mounted at each end of a cable.

This connector has a center pin connected to the center cable conductor and a metal tube connected to the outer cable shield. A rotating ring outside the tube locks the cable to any female connector. TNC stands for Threaded Neill Concelman and is designed as a threaded version of the BNC. The TNC series features screw threads for mating. TNC are miniature, threaded weatherproof units with a constant 50Ω impedance and they operate from 0-11 GHz. There are two types of TNC connectors: Standard and Reverse Polarity. Reverse polarity is a keying system accomplished with a reverse interface, and ensures that reverse polarity interface connectors do not mate with standard interface connectors.

In an embodiment, interposer module 204 and mezzanine module 220 together form a telco hub 218, which is a termination point for one or more telco links 224. In an embodiment, telco links 224 communicate nonpacketized telephony data to and from telco hub 218, and hence chassis 201. Telco links 224 may include copper, optical carriers (OC's) for fiber optic networks, and the like.

In an embodiment, nonpacketized telephony data sent/received from telco link 224 may include analog or digital voice and/or data signals transmitted using time division multiplex (TDM) based signals, dual tone multi-frequency (DTMF) signals, and the like. A dedicated phone connection may communicate at data rates of 1.544 Mbits per second. A T-1 line actually consists of 24 individual channels, each of which supports 64 Kbits per second. In another embodiment, more channels of lower bitrate traffic may be supported as well. In an embodiment, each 64 Kbit/second channel can be configured to carry voice or data traffic. Similar to the North American T-1, E1 is the European format for digital transmission. E1 carries signals at 2 Mbps (32 channels at 64 Kbps, with 2 channels reserved for signaling and controlling), versus the T1, which carries signals at 1.544 Mbps (24 channels at 64 Kbps). J1 is the Japanese version of T1/E1.

A T-3 line actually consists of 672 individual channels, each of which supinterfaces 64 Kbps. T-3 lines are used mainly by Internet Service Providers (ISPs) connecting to the Internet backbone and for the backbone itself. T-3 lines are sometimes referred to as DS3 lines. DS3 signals represent one of a series of standard digital transmission rates based on DS0, a transmission rate of 64 kilobites per second (Kbps), the bandwidth normally used for one telephone voice channel. DS1, used as the signal in a T-1 carrier, carries a multiple of 24 DS0 signals or 1.544 Megabits per second (Mbps). DS3, the signal in a T-3 carrier, carries a multiple of 28 DS1 signals or 672 DS0 signals or 44.74 Mbps.

Figure 3:
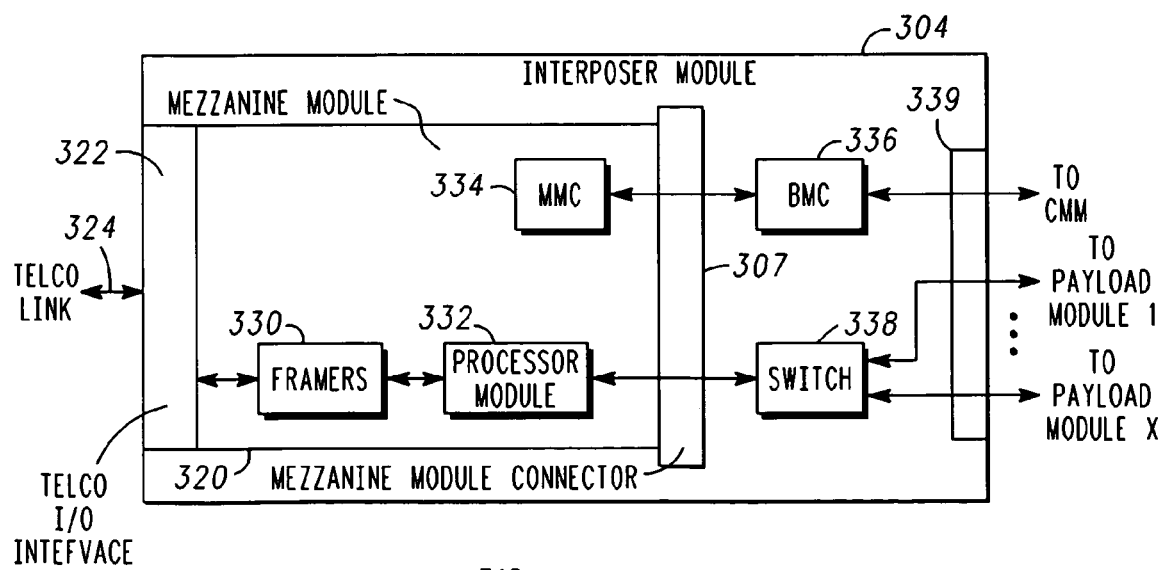
FIG. 3 representatively illustrates a telco hub in accordance with an exemplary embodiment of the present invention.

FIG. 3 representatively illustrates a telco hub 318 in accordance with an exemplary embodiment of the present invention. Telco hub 318 may include an interposer module 304 and a mezzanine module 320. In an embodiment, mezzanine module 320 may be an AMC module. Interposer module 304 may have form factor such that it slidably inserts into a switch slot and interfaces directly with a second side of midplane as described above. Interposer module 304 may have a midplane connector 339 such that it connects directly with midplane and adapts power and data signals to mezzanine module 320.

Interposer module 320 may also include mezzanine module connector 307. Where mezzanine module 320 is an AMC module, mezzanine module connector 307 may be a B connector, AB connector, basic connector, extended connector or any combination thereof. Mezzanine module connector 307 may use a card edge connection style, where conductive traces at the edge of the mezzanine module 320 printed circuit board (PCB) act as male pins, which mate to a female portion in the mezzanine module connector 307. A basic connector style is equipped to interface with a mezzanine module 320 having traces on one side of the PCB. An extended connector is equipped to interface with a mezzanine module 320 having traces on both sides of the PCB.

In an embodiment, mezzanine module 320 may include a module management controller (MMC) 334, which allows mezzanine module 320 to send and receive IPMI signals and communicate with the chassis management module (CMM). IPMI signals may be mapped from the CMM to the MMC 334 via the baseboard management controller (BMC) 336 on interposer module 304. IPMI signals allow the CMM to monitor each module in chassis, for temperature control, hotswap, and the like, including payload modules, switch modules, interposer modules 304 and mezzanine module 320.

In an embodiment, mezzanine module 320 may include telco I/O interface 322, which is a physical and logical connection for one or more telco links 324. In an embodiment, telco I/O interface 322 may be a publicly switched telephone network (PSTN) interface coupled to interface with telco link 324, for example and without limitation, telco trunk lines. In an embodiment, telco I/O interface 322 may include one or more of T1/E1 interface, T3/E3 interface, OC-3 DS3 interface, optical ATM interface, and channelized STM-1 interface, and the like. Framers 330 is disposed to provide timing and line signaling for sent/received nonpacketized telephony data.

In an embodiment, mezzanine module 320 may include a processor module 332 coupled to translate non-packetized telephony data from/to packetized data for communication on switched fabric. Non-packetized telephony data received via telco I/O interface 322 may be converted or encased into packetized data and communicated to switched fabric via switch 338, which may be on interposer module 304. Switch 338 is coupled directly to switched fabric, so that packetized data may be communicated over midplane directly to payload modules for processing and further communication. In an embodiment, switch 338 may be an Ethernet switch, Gigabit Ethernet switch, fibrechannel switch, and the like. As shown, non-packetized telephony data may be delivered to switched fabric directly though mezzanine module 320 and interposer module 304, since mezzanine module 320 and interposer module 304 are connected to midplane in a switch slot of chassis.

Figure 4:
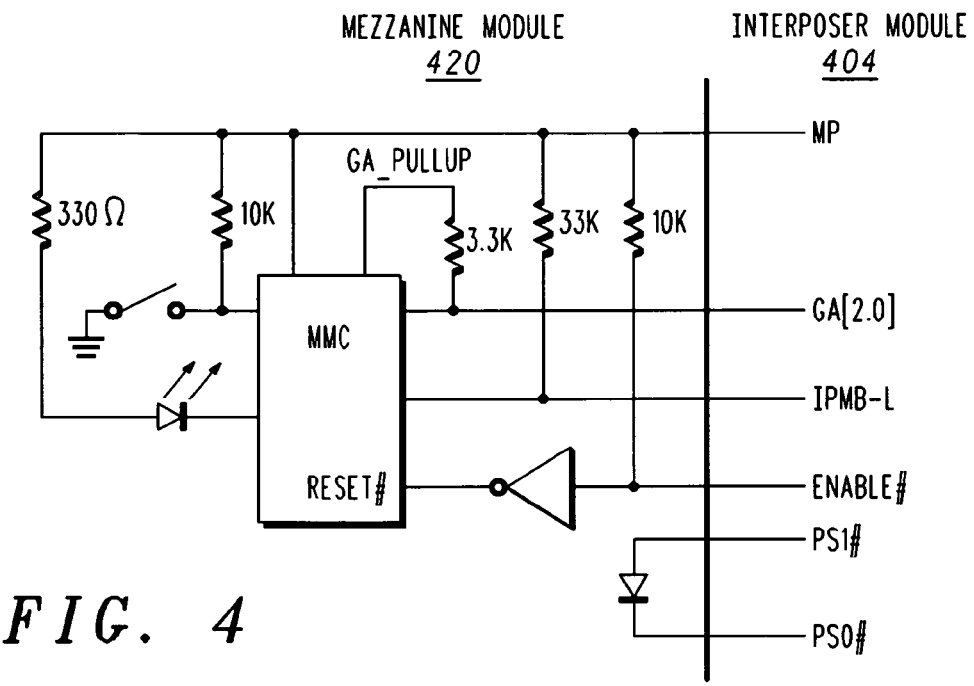
FIG. 4 representatively illustrates an interposer module/mezzanine module interface in accordance with an exemplary embodiment of the present invention.

FIG. 4 representatively illustrates an interposer module/mezzanine module interface in accordance with an exemplary embodiment of the present invention. Although the exemplary embodiment shown in FIG. 4 is for an AMC module, this is not limiting of the invention as other types of mezzanine modules may be used and be within the scope of the invention. In an exemplary embodiment, mezzanine module 420 is an AMC module. In this embodiment, the AMC specification (PICMG® AMC.0 RC1.1) specifies a management interface. In an embodiment, MMC may be programmed to power up and power down based on management power from the chassis as being applied by providing a firmware load for the MMC. In an embodiment, mezzanine module 420, particularly an AMC module, may be hotswapped by programming the MMC to coordinate with the IPMI from the CMM as well.

Management power (MP) carries power from the chassis, and in an embodiment, may derive the 3.3 volts to power the mezzanine module 420 from the 12 volts supplied to the switch slot by the chassis. GA[2..0] are geographic address pins used to assign an Intelligent Platform Management Bus (IPMB) address to mezzanine module 420, which may be derived from the chassis switch slot address. In another embodiment, the IPMB address may be hardcoded. IPMB-L for IPMI messaging between mezzanine module 420 and interposer module 402, which may not be included if the MMC is fitted with a firmware load that minimizes the IPMI message complexity for power up/down, and the like.

Enable#, when active, indicates to mezzanine module 420 that it is fully inserted in the interposer module 402 and that all inputs are connected correctly and removes the MMC from reset. PS0# and PS1# may be used by interposer module 402 to detect the presence of mezzanine module though a low-voltage drop diode.

Figure 5:
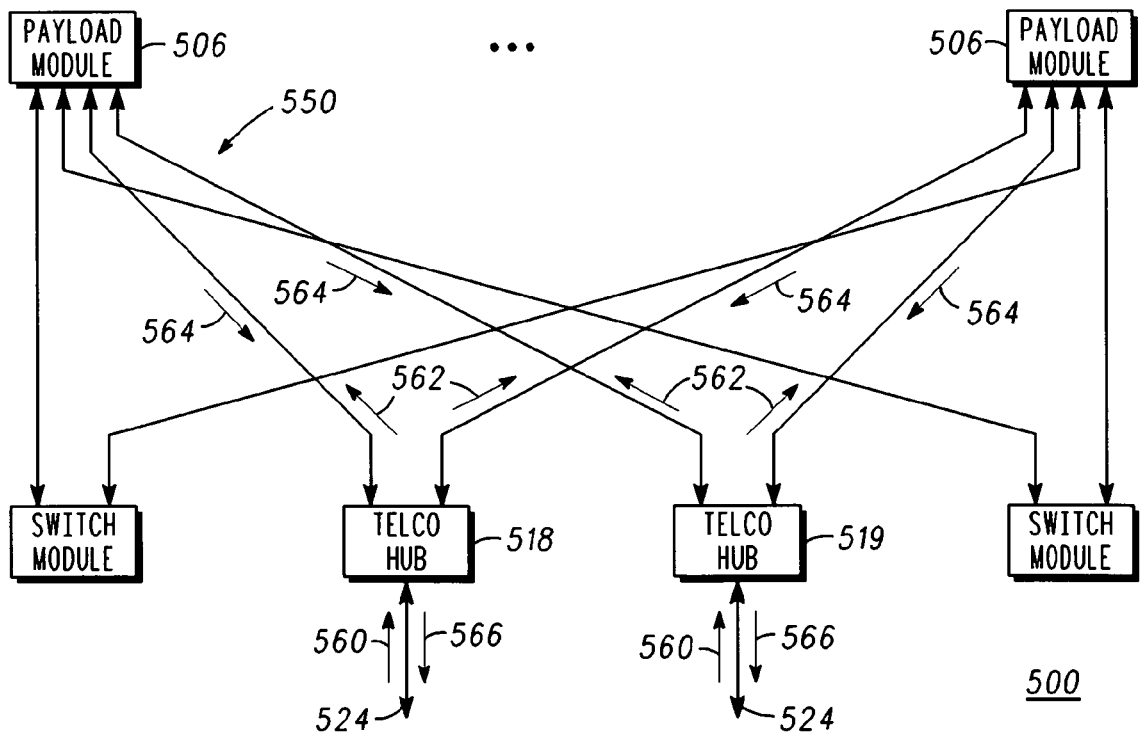
FIG. 5 representatively illustrates a computer system in accordance with yet another exemplary embodiment of the present invention.

FIG. 5 representatively illustrates a computer system 500 in accordance with yet another exemplary embodiment of the present invention. In the embodiment shown, two switch slots in chassis include a switch module 503, while the other two include a telco hub 518, which includes an interposer module and mezzanine module with a telco I/O interface. In the non-limiting, exemplary embodiment shown, computer system may be representative of a BladeCenter™ chassis with fourteen payload modules 506.

In the embodiment shown, two switch modules 503 provide a dual star switch fabric, for example an Ethernet-based switched fabric. Telco hubs 518 used in two other switch slots provide the ability to send/receive non-packetized telephony data 560. As the switched fabric may be exemplarily based on Ethernet, the second dual-star provided by telco hubs 518 creates a dual-dual star switch fabric. Non-packetized telephony data 560 may be communicated over switched fabric 550 using defacto standards or standards based encapsulation techniques.

In the embodiment shown, non-packetized telephony data 560 may be received at telco hubs 518, particularly at the telco I/O interface of a mezzanine module mounted to an interposer module. The non-packetized telephony data 560 may then be converted to packetized data 562, for example at processor unit of mezzanine module using defacto standards and/or encapsulation techniques. Packetized data 562 may include data capable of packet-based data capable of communication using TCP/IP standards. Packetized data 562 may then be communicated to one or more payload modules 506 over switched fabric 550 of midplane, wherein the one or more payload modules 506 may process the packetized data 562 to form processed packetized data 564. Processing may include analyzing, sorting, storing, depacketizing, and the like.

The processed packetized data 564 may then be communicated to telco hubs 518 via switched fabric 550 over the midplane. Telco hubs 518, particularly mezzanine module, may convert processed packetized data 564 to processed non-packetized telephony data 566 and transmit external to chassis via telco I/O interface and telco links 524.

In an embodiment, non-packetized telephony data 560 may be routed though both telco hubs 518 and the data/traffic delivered to one or more payload modules 506 redundantly from both telco hubs 518. The payload module 506 may then decide which version to accept or suppress. Conversely, the payload module 506 may send two versions of processed packetized data 564 to both telco hubs 518 where it is determined which version is to be sent external to chassis as processed non-packetized telephony data 566. This embodiment supports the redundancy and failover expectations of a reliable telco switching computer system.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. A computer system, comprising:
    a chassis having a front side and a rear side, wherein the front side is opposite the rear side;
    a midplane having a first side and a second side;
    a plurality of payload slots on the front side, wherein each of the plurality of payload slots is coupled to receive and connect a payload module to the first side of the midplane;
    a plurality of switch slots on the rear side, wherein each of the plurality of switch slots is coupled to receive and connect a switch module to the second side of the midplane;
    an interposer module coupled to slidably insert into the switch slot and connect to the second side of the midplane; and
    a mezzanine module coupled to the interposer module, wherein the mezzanine module includes a telco I/O interface.

2. The computer system of claim 1, wherein the mezzanine module is an Advanced Mezzanine Card (AMC) module.

3. The computer system of claim 1, wherein the interposer module comprises a switch.

4. The computer system of claim 1, wherein the telco I/O interface is coupled to receive non-packetized telephony data.

5. The computer system of claim 4, wherein the non-packetized telephony data is converted to packetized data and transmitted over the midplane to one or more of the payload module.

6. The computer system of claim 4, wherein the non-packetized telephony data is delivered to a switched fabric directly though the mezzanine module and the interposer module.

7. The computer system of claim 1, wherein the chassis is a BladeCenter chassis.

8. The computer system of claim 1, wherein the I/O interface comprises a PSTN interface.

9. The computer system of claim 8, wherein the PSTN interface consists of at least one of T1/E1/J1 interface, T2/J2 interface, T3/E3/J3 interface, OC-n DS3 interface, optical ATM interface, channelized STM-n interface and channelized STM-nc interface.

10. A method of processing non-packetized telephony data, comprising:
providing a chassis having a front side and a rear side, wherein the front side is opposite the rear side;
providing a midplane having a first side and a second side;
receiving the non-packetized telephony data at a telco I/O interface of a mezzanine module, wherein the mezzanine module is mounted to an interposer module, and wherein the interposer module is coupled to the second side of the midplane via a switch slot on the rear side of the chassis;
converting the non-packetized telephony data to packetized data;
communicating the packetized data to one or more of a plurality of payload modules over a switched fabric on the midplane, wherein each of the one or more plurality of payload modules is coupled to the first side of the midplane via a payload slot on the front side of the chassis;
the one or more plurality of payload modules processing the packetized data, thereby forming processed packetized data;
communicating the processed packetized data to the mezzanine module over the switched fabric on the midplane;
converting the processed packetized data to processed non-packetized telephony data; and
transmitting the processed non-packetized telephony data external to the chassis via the telco I/O interface of the mezzanine module.

11. The method of claim 10, wherein the mezzanine module is an Advanced Mezzanine Card (AMC) module.

12. The method of claim 10, further comprising communicating the non-packetized telephony data to the switched fabric directly though the mezzanine module and the interposer module.

13. The method of claim 10, wherein the chassis is a BladeCenter chassis.

14. The method of claim 10, wherein the I/O interface comprises a PSTN interface.

15. The method of claim 14, wherein the PSTN interface consists of at least one of T1/E1/J1 interface, T2/J2 interface, T3/E3/J3 interface, OC-n DS3 interface, optical ATM interface, channelized STM-n interface and channelized STM-nc interface.

16. A telco hub in a chassis having a front side and a rear side, wherein the chassis includes a midplane having a first side and a second side, the telco hub, comprising:
an interposer module coupled to slidably insert into a switch slot on the rear side and connect to the second side of the midplane;
a mezzanine module coupled to the interposer module, wherein the mezzanine module includes a telco I/O interface, wherein the mezzanine module is coupled to receive non-packetized telephony data and wherein the telco hub is coupled to:
convert the non-packetized telephony data to packetized data; and
communicate the packetized data to one or more of a plurality of payload modules over a switched fabric on the midplane, wherein each of the one or more plurality of payload modules is coupled to the first side of the midplane via a payload slot on the front side of the chassis.

17. The telco hub of claim 16, wherein the non-packetized telephony data is communicated to the switched fabric directly though the mezzanine module and the interposer module.

18. The telco hub of claim 16, wherein the mezzanine module is an Advanced Mezzanine Card (AMC) module.

19. The telco hub of claim 16, wherein the chassis is a BladeCenter chassis.

20. The telco hub of claim 16, wherein the I/O interface comprises a PSTN interface.

21. The telco hub of claim 20, wherein the PSTN interface consists of at least one of T1/E1/J1 interface, T2/J2 interface, T3/E3/J1 interface, OC-n DS3 interface, optical ATM interface, channelized STM-n interface and channelized STM-nc interface.

22. The telco hub of claim 16, wherein the interposer module comprises a switch.

23. The telco hub of claim 16, wherein the interposer module maps power and IPMI messages from the chassis to the mezzanine module.

* * * * *